United States Patent
Ducher

(10) Patent No.: US 12,077,031 B2
(45) Date of Patent: Sep. 3, 2024

(54) VARIABLE SPEED FOR TRANSPORT ENGLINELESS REFRIGERATION UNIT

(71) Applicant: Carrier Corporation, Palm Beach Gardens, FL (US)

(72) Inventor: Gael Ducher, Olivet (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 513 days.

(21) Appl. No.: 15/734,651

(22) PCT Filed: Oct. 11, 2018

(86) PCT No.: PCT/IB2018/001249
§ 371 (c)(1),
(2) Date: Dec. 3, 2020

(87) PCT Pub. No.: WO2020/074935
PCT Pub. Date: Apr. 16, 2020

(65) Prior Publication Data
US 2021/0221195 A1    Jul. 22, 2021

(51) Int. Cl.
*B60H 1/32* (2006.01)
*B60H 1/00* (2006.01)

(52) U.S. Cl.
CPC ....... *B60H 1/00428* (2013.01); *B60H 1/3232* (2013.01); *B60H 2001/3261* (2013.01);
(Continued)

(58) Field of Classification Search
CPC ............ B60H 1/00014; B60H 1/00364; B60H 1/00428; B60H 1/3226; B60H 1/3232;
(Continued)

(56) References Cited

U.S. PATENT DOCUMENTS 4,172,493 A    10/1979  Jacobs
5,046,326 A *  9/1991  Havemann ............ F04D 25/022
                                            62/239
(Continued)

FOREIGN PATENT DOCUMENTS

WO    2009029205 A1    3/2009

OTHER PUBLICATIONS

International Search Report for International Application No. PCT/IB2018/001249; International Filing Date: Oct. 11, 2018; Date of Mailing: Jul. 17, 2019, 6 pages.
(Continued)

*Primary Examiner* — Eric S Ruppert
*Assistant Examiner* — Hans R Weiland
(74) *Attorney, Agent, or Firm* — CANTOR COLBURN LLP

(57) ABSTRACT

A transportation refrigeration unit for cooling a cargo compartment includes a compressor configured to compress a refrigerant, a compressor motor configured to drive the compressor, an evaporator heat exchanger operatively coupled to the compressor and an evaporator fan configured to provide return airflow from a return air intake and flow the return airflow over the evaporator heat exchanger. A drive unit is configured to deliver variable frequency electrical power between a minimum frequency and a maximum frequency to the compressor motor and the evaporator fan. A frequency of the electrical power is based on one or more sensed parameters of the transportation refrigeration unit.

17 Claims, 3 Drawing Sheets

(52) U.S. Cl.
CPC ............... *B60H 2001/3272* (2013.01); *B60H 2001/3292* (2013.01)

(58) Field of Classification Search
CPC .... B60H 2001/3261; B60H 2001/3292; F25B 9/008; F25B 40/00; H02J 7/0068; H02J 7/02; H02J 7/1415; H02J 2207/20; H02J 2310/40
See application file for complete search history.

(56) References Cited

U.S. PATENT DOCUMENTS

| | | | |
|---|---|---|---|
| 5,056,330 | A | 10/1991 | Isobe et al. |
| 5,563,802 | A | 10/1996 | Plahn et al. |
| 5,996,367 | A | 12/1999 | Harnish |
| 6,044,651 | A | 4/2000 | Reason et al. |
| 6,124,646 | A | 9/2000 | Artinian et al. |
| 6,226,998 | B1 | 5/2001 | Reason et al. |
| 7,743,616 | B2 | 6/2010 | Renken et al. |
| 8,987,939 | B2 | 3/2015 | Yu et al. |
| 9,021,823 | B2 | 5/2015 | Caillat |
| 9,194,286 | B2 | 11/2015 | Burnham et al. |
| 9,729,008 | B2 | 8/2017 | Votoupal et al. |
| 9,745,908 | B2 | 8/2017 | Lucht et al. |
| 9,995,210 | B2 | 6/2018 | Burnham et al. |
| 2003/0201097 | A1* | 10/2003 | Zeigler ................ B60H 1/3226 62/238.7 |
| 2008/0011007 | A1* | 1/2008 | Larson ............... B60H 1/00428 62/243 |
| 2009/0211280 | A1* | 8/2009 | Alston .................. F25D 23/006 62/428 |
| 2010/0154449 | A1* | 6/2010 | Stover, Jr. ............ B60H 1/3232 62/323.3 |
| 2010/0263393 | A1* | 10/2010 | Chen ........................ F25B 1/10 62/434 |
| 2011/0247350 | A1* | 10/2011 | Awwad ................... F25B 27/00 62/323.3 |
| 2013/0248165 | A1* | 9/2013 | Kandasamy .......... F25D 29/003 165/271 |
| 2018/0094846 | A1* | 4/2018 | Koelsch ................ F25D 29/003 |

OTHER PUBLICATIONS

Written Opinion for International Application No. PCT/IB2018/001249; International Filing Date: Oct. 11, 2018; Date of Mailing: Jul. 17, 2019, 10 pages.

* cited by examiner

VARIABLE SPEED FOR TRANSPORT ENGINELESS REFRIGERATION UNIT

CROSS REFERENCE TO RELATED APPLICATIONS

This application is a National Stage application of PCT/IB2018/001249, filed Oct. 11, 2018, the disclosure of which is incorporated herein by reference in its entirety.

BACKGROUND

The subject matter disclosed herein generally relates to transportation refrigeration units, and more specifically transportation refrigeration units powered by an engine of a vehicle, such as a truck, into which the transportation refrigeration unit is installed.

Traditional refrigerated cargo trucks or refrigerated tractor trailers, such as those utilized to transport cargo via sea, rail, or road, is a truck, trailer or cargo container, generally defining a cargo compartment, and modified to include a refrigeration system located at one end of the truck, trailer, or cargo container. Refrigeration systems typically include a compressor, a condenser, an expansion valve, and an evaporator serially connected by refrigerant lines in a closed refrigerant circuit in accord with known refrigerant vapor compression cycles. A power unit, such as a combustion engine, drives the compressor of the refrigeration unit, and may be diesel powered, natural gas powered, or other type of engine. In many tractor trailer transport refrigeration systems, the compressor is driven by the engine shaft either through a belt drive or by a mechanical shaft-to-shaft link.

In some systems, the an Eco-Drive® generator is connected to the vehicle engine to convert rotational energy of the vehicle engine into electrical power and distributes the electrical power to components of the transportation refrigeration unit for the use thereof. When Eco-Drive® is installed on truck and commissioned for operation, the system is set to provide a continuous and nominal power at 400V/3/50 Hz or 460V/3/62 Hz to the transportation refrigeration unit. As a consequence components of the transport refrigeration unit, such as a compressor and an evaporator fan, have only one fixed speed of operation.

BRIEF DESCRIPTION

In one embodiment, a transportation refrigeration unit for cooling a cargo compartment includes a compressor configured to compress a refrigerant, a compressor motor configured to drive the compressor, an evaporator heat exchanger operatively coupled to the compressor and an evaporator fan configured to provide return airflow from a return air intake and flow the return airflow over the evaporator heat exchanger. A drive unit is configured to deliver variable frequency electrical power between a minimum frequency and a maximum frequency to the compressor motor and the evaporator fan. A frequency of the electrical power is based on one or more sensed parameters of the transportation refrigeration unit.

Additionally or alternatively, in this or other embodiments the drive unit is configured to deliver electrical power in the range of 35 Hz to 65 Hz.

Additionally or alternatively, in this or other embodiments the drive unit is an electrical generator operably connected to a vehicle engine.

Additionally or alternatively, in this or other embodiments the electrical generator is operably connected to the vehicle engine via a hydraulic pump, the electrical generator converting hydraulic power to electrical power.

Additionally or alternatively, in this or other embodiments the one or more sensed parameters includes one or more of a difference between a cargo compartment temperature and a set point temperature or a door position of the cargo compartment.

Additionally or alternatively, in this or other embodiments the electrical power is continuously variable between the minimum frequency and the maximum frequency.

Additionally or alternatively, in this or other embodiments a control unit is operably connected to the drive unit to command the drive unit based on the one or more sensed parameters.

In another embodiment, a transportation refrigeration system includes a vehicle including a vehicle engine to drive the vehicle, a cargo compartment, and a transportation refrigeration unit configured to cool the cargo compartment. The transportation refrigeration unit includes a compressor configured to compress a refrigerant, a compressor motor configured to drive the compressor, an evaporator heat exchanger operatively coupled to the compressor, and an evaporator fan configured to provide return airflow from a return air intake and flow the return airflow over the evaporator heat exchanger. A drive unit is operably connected to, and driven by the vehicle engine. The drive unit is configured to deliver variable frequency electrical power between a minimum frequency and a maximum frequency to the compressor motor and the evaporator fan. A frequency of the electrical power is based on one or more sensed parameters of the transportation refrigeration unit.

Additionally or alternatively, in this or other embodiments the drive unit is configured to deliver electrical power in the range of 35 Hz to 65 Hz.

Additionally or alternatively, in this or other embodiments the drive unit is an electrical generator operably connected to the vehicle engine.

Additionally or alternatively, in this or other embodiments the electrical generator is operably connected to the vehicle engine via a hydraulic pump, the electrical generator converting hydraulic power to electrical power.

Additionally or alternatively, in this or other embodiments the one or more sensed parameters includes one or more of a difference between a cargo compartment temperature and a set point temperature or a door position of the cargo compartment.

Additionally or alternatively, in this or other embodiments the electrical power is continuously variable between the minimum frequency and the maximum frequency.

Additionally or alternatively, in this or other embodiments a control unit is operably connected to the drive unit to command the drive unit based on the one or more sensed parameters.

In yet another embodiment, a method of operating a transportation refrigeration unit includes powering a drive unit of the transportation unit using a vehicle engine, operating one or more of a compressor motor and an evaporator fan of the transportation refrigeration unit via electrical power provided by the drive unit, and varying a frequency of the electrical power provided by the drive unit between a minimum frequency and a maximum frequency.

Additionally or alternatively, in this or other embodiments the frequency is varied based on one or more sensed operating parameters of the transportation refrigeration unit.

Additionally or alternatively, in this or other embodiments the one or more sensed parameters includes a difference between a cargo compartment temperature and a set point temperature.

Additionally or alternatively, in this or other embodiments the one or more sensed parameters includes a door position of the cargo compartment.

Additionally or alternatively, in this or other embodiments the drive unit is configured to deliver electrical power in the range of 35 Hz to 65 Hz.

Additionally or alternatively, in this or other embodiments the electrical power is continuously variable between the minimum frequency and the maximum frequency.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
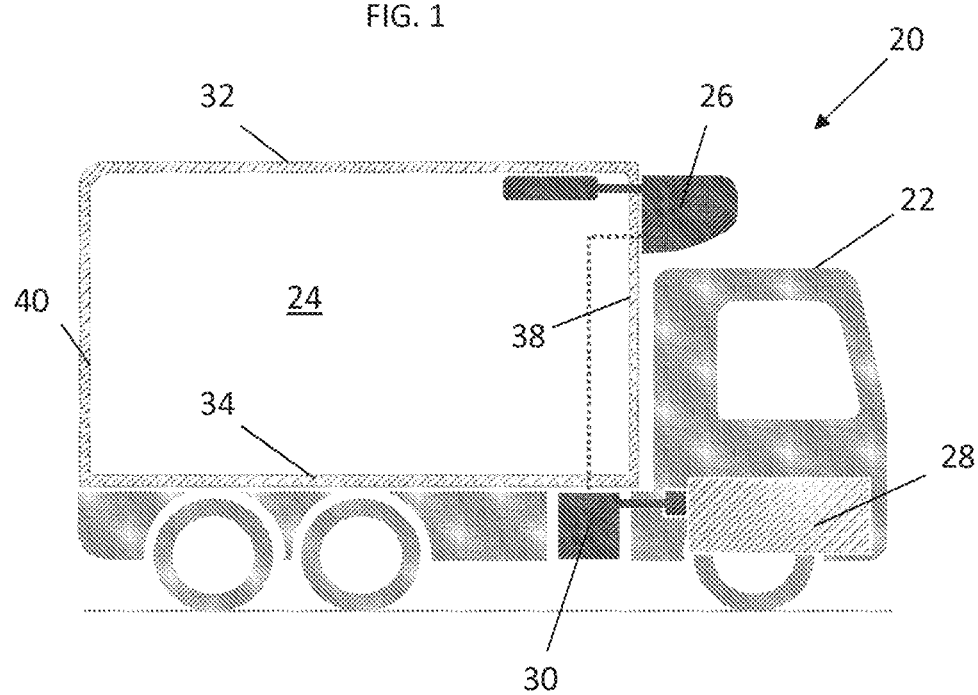
FIG. 1 is a schematic illustration of an embodiment of a vehicle having a refrigerated cargo container.

Referring to FIG. 1, a transport refrigeration system 20 of the present disclosure is illustrated. In the illustrated embodiment, the transport refrigeration system 20 includes a vehicle, for example, a truck 22, having a cargo compartment 24. An engineless transportation refrigeration unit (TRU) 26 is utilized to provide a desired temperature and humidity range. A vehicle engine 28, such as a gasoline or diesel combustion engine, provides power to drive movement of the truck 22, and a drive unit 30 is utilized to provide electrical power to the TRU 26. The drive unit 30 is connected to the vehicle engine 28 such that the drive unit 30 converts rotational energy from the vehicle engine 28 into electrical power, which the drive unit 30 distributes to various components of the transportation refrigeration unit 26 to power the components. It is understood that embodiments described herein may be applied to shipping containers that are shipped by rail, sea, air, or any other suitable container, thus the vehicle may be a truck, train, boat, airplane, helicopter, etc.

Figure 2:
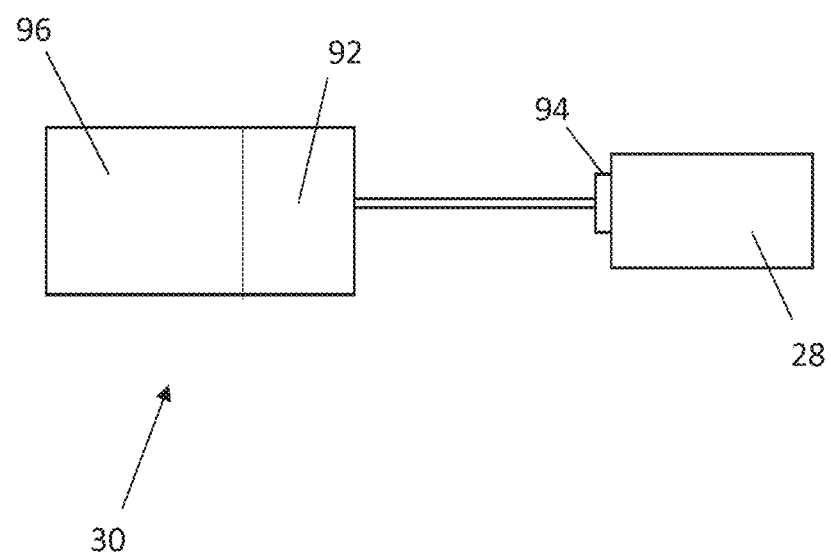
FIG. 2 is a schematic view of a power drive unit for a refrigerated cargo container.

Referring to FIG. 2, in some embodiments the drive unit 30 is a hydraulic system including a hydraulic pump 92 connected to and driven by the vehicle engine 28 at a power take off 94. An electrical generator 96 is connected to the hydraulic pump 92 and converts the hydraulic power to electrical power.

Figure 3:
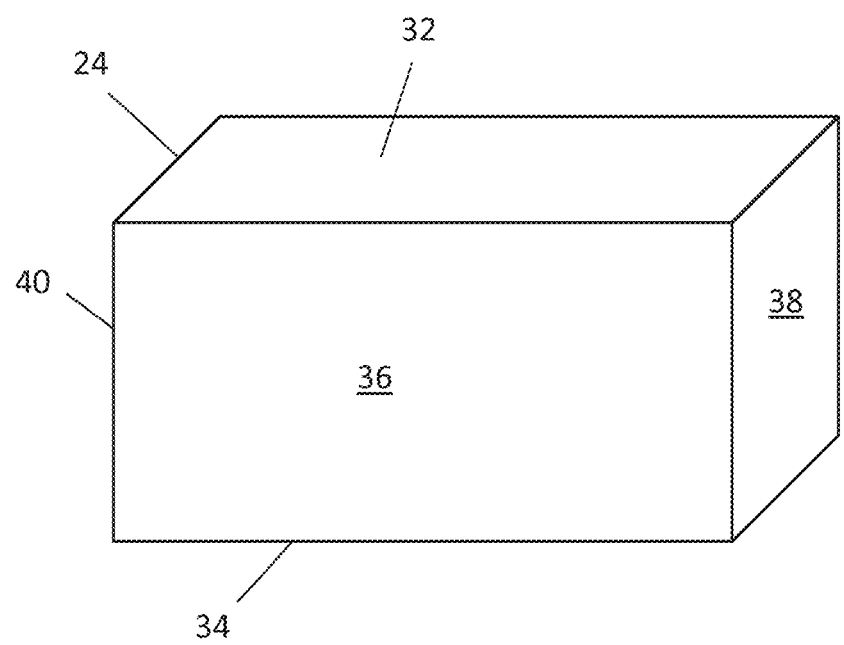
FIG. 3 is a schematic illustration of an embodiment of a cargo container.

Referring to FIG. 3, the cargo compartment 24 may include a top wall 32, a bottom wall 34 opposed to and spaced from the top wall 32, two side walls 36 spaced from and opposed to one-another, and opposing front and rear walls 38, 40. The cargo compartment 24 may further include doors (not shown) at the rear wall 40, or any other wall.

Typically, transport refrigeration systems 20 are used to transport and distribute cargo, such as, for example perishable goods and environmentally sensitive goods (herein referred to as perishable goods). The perishable goods may include but are not limited to fruits, vegetables, grains, beans, nuts, eggs, dairy, seed, flowers, meat, poultry, fish, ice, blood, pharmaceuticals, or any other suitable cargo requiring cold chain transport. In the illustrated embodiment, the TRU 26 is associated with a cargo compartment 24 to provide desired environmental parameters, such as, for example temperature, pressure, humidity, carbon dioxide, ethylene, ozone, light exposure, vibration exposure, and other conditions to the cargo compartment 24. In further embodiments, the TRU 26 is a refrigeration system capable of providing a desired temperature and humidity range.

The engineless TRU 26 is generally integrated into the cargo compartment 24 and may be mounted to the front wall 38. The cargo is maintained at a desired temperature by cooling of the cargo compartment 24 via the TRU 26 that circulates airflow into and through the cargo compartment 24.

Figure 4:
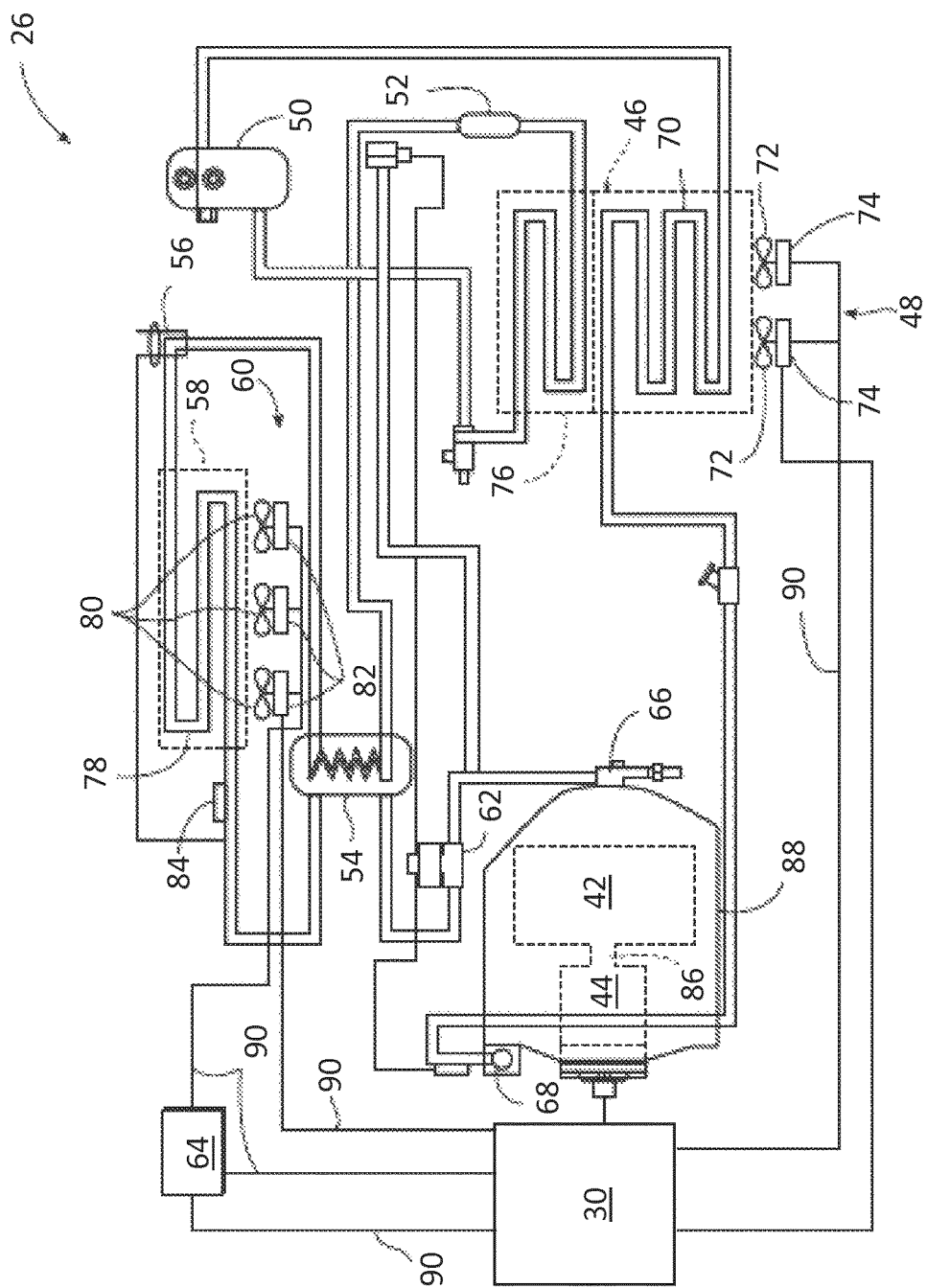
FIG. 4 is a schematic illustration of an embodiment of a transportation refrigeration unit.

Referring now to FIG. 4, the components of the engineless TRU 26 may include a compressor 42, an electric compressor motor 44, a condenser 46 that may be air cooled, a condenser fan assembly 48, a receiver 50, a filter dryer 52, a heat exchanger 54, a thermostatic expansion valve 56, an evaporator 58, an evaporator fan assembly 60, a suction modulation valve 62, and a control unit 64 that may include a computer-based processor (e.g., microprocessor). Operation of the engineless TRU 26 may best be understood by starting at the compressor 42, where the suction gas, for example, a refrigerant gas, enters the compressor at a suction port 66 and is compressed to a higher temperature and pressure. The refrigerant gas is emitted from the compressor at an outlet port 68 and may then flow into tube(s) 70 of the condenser 46.

Air flowing across a plurality of condenser coil fins (not shown) and the tubes 70, cools the gas to its saturation temperature. The air flow across the condenser 46 may be facilitated by one or more fans 72 of the condenser fan assembly 48. The condenser fans 72 may be driven by respective condenser fan motors 74 of the condenser fan assembly 70 that may be electric.

By removing latent heat, the gas within the tubes 70 condenses to a high pressure and high temperature liquid and flows to the receiver 50 that provides storage for excess liquid refrigerant during low temperature operation. From the receiver 50, the liquid refrigerant may pass through a sub-cooler heat exchanger 76 of the condenser 46, through the filter-dryer 52 that keeps the refrigerant clean and dry, then to the heat exchanger 54 that increases the refrigerant sub-cooling, and finally to the thermostatic expansion valve 56.

As the liquid refrigerant passes through the orifices of the expansion valve 56, some of the liquid vaporizes into a gas (i.e., flash gas). Return air from the refrigerated space (i.e., cargo compartment 24) flows over the heat transfer surface of the evaporator 58. As the refrigerant flows through a plurality of tubes 78 of the evaporator 58, the remaining liquid refrigerant absorbs heat from the return air, and in so doing, is vaporized.

The evaporator fan assembly 60 includes one or more evaporator fans 80 that may be driven by respective fan motors 82 that may be electric. The air flow across the evaporator 58 is facilitated by the evaporator fans 80. From the evaporator 58, the refrigerant, in vapor form, may then flow through the suction modulation valve 62, and back to the compressor 42. A thermostatic expansion valve bulb sensor 84 may be located proximate to an outlet of the evaporator tube 78. The bulb sensor 84 is intended to control the thermostatic expansion valve 56, thereby controlling refrigerant superheat at an outlet of the evaporator tube 78. It is further contemplated and understood that the above generally describes a single stage vapor compression system that may be used for HFCs such as R-404a, R-134a, R452a, R448a, R453a, R454a and natural refrigerants such as propane and ammonia. Other refrigerant systems may also be applied that use carbon dioxide ($CO_2$) refrigerant, and that may be a two-stage vapor compression system. It is to be appreciated, however, that the listed refrigerants are merely examples thereof, and other refrigerants may be utilized.

A bypass valve (not shown) may facilitate the flash gas of the refrigerant to bypass the evaporator 58. This will allow the evaporator coil to be filled with liquid and completely 'wetted' to improve heat transfer efficiency. With $CO_2$ refrigerant, this bypass flash gas may be re-introduced into a mid-stage of a two-stage compressor.

The compressor 42 and the compressor motor 44 may be linked via an interconnecting drive shaft 86. The compressor 42, the compressor motor 44 and the drive shaft 86 may all be sealed within a common housing 88. The compressor 42 may be a single compressor. The single compressor may be a two-stage compressor, a scroll-type compressor or other compressors adapted to compress HFCs or natural refrigerants. The natural refrigerant may be $CO_2$, propane, ammonia, or any other natural refrigerant that may include a global-warming potential (GWP) of about one (1).

The drive unit 30 is connected to electrically-driven components of the TRU 26, such as the compressor motor 44, evaporator fan assembly 60 and condenser fan assembly 48, and the control unit 64, via a plurality of electrical pathways 90. The control unit 64 is configured to command a frequency of operation of the drive unit 30, such that sufficient electrical power is delivered to the TRU 26 components based on operational parameters of the transport refrigeration system 20. The operational frequency of the drive unit 30 is variable, and in some embodiments is continuously variable in a frequency range between a minimum frequency and a maximum frequency. In some embodiments, the minimum frequency is 35 Hz and the maximum frequency is 65 Hz. Operating the drive unit 30 at the minimum frequency provides a minimum cooling capacity from the compressor 42 and a minimum airflow from the evaporator fan assembly 60 and condenser fan assembly 48. Likewise, operating the drive unit 30 at the maximum frequency provides a maximum cooling capacity from the compressor 42 and a maximum airflow from the evaporator fan assembly 60 and condenser fan assembly 48. In some embodiments, the drive unit 30 is operable at any frequencies between the minimum frequency and the maximum frequency to tune cooling capacity provided by the compressor 42 and airflow provided by the evaporator fan assembly 60 and the condenser fan assembly 48.

The control unit 64 utilizes parameters such as set point temperature of the TRU 26, actual temperature in the cargo compartment 24, delta temperature between the actual temperature and the set point temperature, whether or not cargo compartment doors are opened or closed, etc., to determine an optimal drive unit 30 frequency within the frequency range to produce a desired level of electrical power to meet the electrical power needs of the TRU 26. For example, in operating conditions where the delta temperature (cargo compartment temperature minus set point temperature) is relatively high, the control unit 64 will command the drive unit 30 to operate at maximum power at the maximum frequency until the set point temperature is reached and equaled by the cargo compartment temperature. Conversely, in operating conditions where the delta temperature is relatively low, the control unit 64 will command the drive unit top operate at maximum power at the minimum frequency until the set point temperature is reached.

Utilizing a drive unit 30 having variable frequency of operation has the technical effect of reducing set point recovery times especially in cases where the delta temperature is relatively high. Further, such capability improves efficiency of the TRU 26 and fuel efficiency of the vehicle engine 28, and also reduces $CO_2$ emissions of the vehicle engine 28. Further, controlling operating frequency at the drive unit 30 alleviates the need to incorporate complex variable speed components in the fan assemblies and the compressor, and is beneficially efficient and reliable compared to such components.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A transportation refrigeration unit for cooling a cargo compartment comprising:
    a compressor configured to compress a refrigerant;
    a compressor motor configured to drive the compressor;
    an evaporator heat exchanger operatively coupled to the compressor;
    an evaporator fan configured to provide return airflow from a return air intake and flow the return airflow over the evaporator heat exchanger;
    a drive unit configured to be connected to and driven by a vehicle engine, the drive unit configured to deliver variable frequency electrical power between a minimum frequency and a maximum frequency to the compressor motor and the evaporator fan;
    wherein the drive unit is an electrical generator configured to continuously vary its operational frequency between the minimum frequency and the maximum frequency in response to one or more sensed parameters of the transportation refrigeration unit.

2. The transportation refrigeration unit of claim 1, wherein the drive unit is configured to deliver electrical power in the range of 35 Hz to 65 Hz.

3. The transportation refrigeration unit of claim 1, wherein the electrical generator is operably connected to the vehicle engine via a hydraulic pump, the electrical generator converting hydraulic power to electrical power.

4. The transportation refrigeration unit of claim 1, wherein the one or more sensed parameters includes one or more of a difference between a cargo compartment temperature and a set point temperature or a door position of the cargo compartment.

5. The transportation refrigeration unit of claim 1, wherein the electrical power is continuously variable between the minimum frequency and the maximum frequency.

6. The transportation refrigeration unit of claim 1, further comprising a control unit operably connected to the drive unit to command the drive unit based on the one or more sensed parameters.

7. A transportation refrigeration system, comprising:
a vehicle including:
a vehicle engine to drive movement of the vehicle; and
a cargo compartment; and
a transportation refrigeration unit configured to cool the cargo compartment, including:
a compressor configured to compress a refrigerant;
a compressor motor configured to drive the compressor;
an evaporator heat exchanger operatively coupled to the compressor;
an evaporator fan configured to provide return airflow from a return air intake and flow the return airflow over the evaporator heat exchanger;
a drive unit operably connected to, and driven by the vehicle engine, the drive unit configured to deliver variable frequency electrical power between a minimum frequency and a maximum frequency to the compressor motor and the evaporator fan;
wherein the drive unit is an electrical generator operably connected to the vehicle engine, the electrical generator configured to continuously vary its operational frequency between the minimum frequency and the maximum frequency in response to one or more sensed parameters of the transportation refrigeration unit.

8. The transportation refrigeration system of claim 7, wherein the drive unit is configured to deliver electrical power in the range of 35 Hz to 65 Hz.

9. The transportation refrigeration system of claim 7, wherein the electrical generator is operably connected to the vehicle engine via a hydraulic pump, the electrical generator converting hydraulic power to electrical power.

10. The transportation refrigeration system of claim 7, wherein the one or more sensed parameters includes one or more of a difference between a cargo compartment temperature and a set point temperature or a door position of the cargo compartment.

11. The transportation refrigeration system claim 7, wherein the electrical power is continuously variable between the minimum frequency and the maximum frequency.

12. The transportation refrigeration system of claim 7, further comprising a control unit operably connected to the drive unit to command the drive unit based on the one or more sensed parameters.

13. A method of operating a transportation refrigeration unit, comprising:
powering a drive unit of the transportation unit using a vehicle engine;
operating one or more of a compressor motor and an evaporator fan of the transportation refrigeration unit via electrical power provided by the drive unit; and
varying a frequency of the electrical power provided by the drive unit between a minimum frequency and a maximum frequency;
wherein the drive unit is an electrical generator operably connected to the vehicle engine, the electrical generator configured to continuously vary its operational frequency between the minimum frequency and the maximum frequency in response to one or more sensed operating parameters of the transportation refrigeration unit; and
wherein the vehicle engine is configured to drive movement of the vehicle.

14. The method of claim 13, wherein the one or more sensed parameters includes a difference between a cargo compartment temperature and a set point temperature.

15. The method of claim 13, wherein the one or more sensed parameters includes a door position of the cargo compartment.

16. The method of claim 13, wherein the drive unit is configured to deliver electrical power in the range of 35 Hz to 65 Hz.

17. The method of claim 13, wherein the electrical power is continuously variable between the minimum frequency and the maximum frequency.

* * * * *